United States Patent
Kim et al.

(10) Patent No.: US 7,422,289 B2
(45) Date of Patent: Sep. 9, 2008

(54) FRAME PANEL

(75) Inventors: Hee-Deog Kim, Seoul (KR);
Hyung-Jun Ahn, Daejeon-si (KR);
In-Se Yoon, Daegu-si (KR)

(73) Assignee: LG Chem, Ltd. (KR)

(*) Notice: Subject to any disclaimer, the term of this patent is extended or adjusted under 35 U.S.C. 154(b) by 154 days.

(21) Appl. No.: 11/411,697

(22) Filed: Apr. 26, 2006

(65) Prior Publication Data
US 2007/0046069 A1    Mar. 1, 2007

(30) Foreign Application Priority Data
Apr. 29, 2005   (KR)   ............... 10-2005-0036014
Apr. 6, 2006    (KR)   ............... 10-2006-0031541

(51) Int. Cl.
*B60N 2/64*   (2006.01)
(52) U.S. Cl. ............... 297/452.18; 297/452.65; 297/452.55
(58) Field of Classification Search ............ 297/452.65, 297/284.4, 452.2, 452.18, 452.55; 29/897.2
See application file for complete search history.

(56) References Cited

U.S. PATENT DOCUMENTS

| | | | | |
|---|---|---|---|---|
| 5,100,204 | A | * | 3/1992 | Makihara et al. ....... 297/452.65 |
| 6,679,558 | B2 | * | 1/2004 | Adams et al. .......... 297/452.65 |
| 2003/0075968 | A1 | * | 4/2003 | Gupta et al. ........... 297/452.18 |
| 2004/0070233 | A1 | * | 4/2004 | Steinhauser et al. .... 296/193.01 |

FOREIGN PATENT DOCUMENTS

KR    1020040030082    4/2004
WO       2003016091    2/2003

* cited by examiner

*Primary Examiner*—David R Dunn
*Assistant Examiner*—James Alex
(74) *Attorney, Agent, or Firm*—Cantor Colburn LLP

(57) ABSTRACT

The present invention relates to a frame panel having an improved reinforcing pattern. The frame panel includes a panel body having a front plate and a rear plate, which are integrally formed as a single body through a blowing process. The front plate has vertical groove patterns and horizontal groove patterns on the outside area except for the central area thereof, while the rear plate has vertical groove patterns and horizontal groove patterns on each of the central area and the outside area thereof, thus forming rectangular reinforcing groove patterns, with a diagonal groove pattern diagonally extending upwards from the lower end of a side of the rectangular reinforcing groove pattern provided on the outside area of the rear plate such that the diagonal groove pattern passes through the rectangular reinforcing groove pattern provided on the central area of the rear plate. Due to the location, orientation and depth of both the hollow pattern and the groove patterns, the present invention realizes lightness of the frame panel, provides excellent structural strength of the frame, panel, and remarkably reduces the manufacturing cost of the frame panel.

5 Claims, 12 Drawing Sheets

FRAME PANEL

This application claims the benefit of the filing date of Korean Patent Application Nos. 10-2005-0036014 and 10-2006-0031541, filed on Apr. 29, 2005 and Apr. 6, 2006, in the Korean intellectual Property Office, the disclosure of which is incorporated herein its entirety by reference

TECHNICAL FIELD

The present invention relates to frame panels having improved reinforcing patterns and, more particularly, to a frame panel having a front plate and a rear plate, in which the front plate and the rear plate are integrally formed as a single body through a blowing process, and which is provided with a reinforcing pattern configured as an improved hollow pattern and improved groove patterns, thus accomplishing lightness, providing excellent structural strength, and remarkably reducing the manufacturing cost thereof.

BACKGROUND ART

Generally, frame panels have been typically used as supports in a variety of products. For example, a seat back of a car is provided therein with a frame panel, thus being reinforced and supported by the frame panel. The frame panel used in the seat back of a passenger car must efficiently support the weight of a person sitting on the seat. Furthermore, a frame panel used in the seat back of a truck must have a high structural strength capable of efficiently supporting the weight of a person sitting on the seat and efficiently resisting impact which may be applied by the freight loaded in the truck. In the case of a rear seat back frame, panel installed in the rear end of the passenger compartment of a passenger car, the frame panel must meet the European requirements ECE 17.07, which were established to protect passengers from impact, which may be applied by freight loaded in the trunk of the car without being fastened or fixed, when a driver suddenly stops the car while driving the car.

Conventional seat back frame panels have been typically made of steel. However, steel complicates the process of producing the frame panels and increases the weight of the frame panels because it is heavy. Furthermore, the steel frame panel is thick to secure desired strength, thus increasing the weight of the frame panel. When the weight of the frame panel increases as described above, the frame panel is difficult to handle and increases the weight of a car body, thus reducing the mileage of the car. Therefore, it is necessary to configure the seat back frame panel such that the seat back frame panel is both light and intrinsically secures substantial strength.

Accordingly, in recent years, techniques of using reinforced plastic as the material of the seat back frame panels in place of the conventional steel have been proposed. For example, glass mat thermoplastics (GMT) or long fiber reinforced thermoplastics (LFT) have been proposed to replace the conventional steel as the material of the seat back frame panels. Furthermore, to increase the strength of the reinforced plastic frame panel and to prevent the plastic frame panel from undesired bending, a plurality of ribs is formed as a reinforcing pattern on the plastic frame panel (first conventional technique). The plastic frame panel according to the first conventional technique is shown in FIG. 1.

FIG. 1 is a plan view illustrating the seat back frame panel according to the first conventional technique. FIG. 1 illustrates the most typical seat back frame panel. As shown in FIG. 1, the conventional seat back frame panel is typically made of reinforced plastic through a pressing process and comprises a plate body 1 and a plurality of ribs 1a, which is formed as a reinforcing pattern on the surface of the plate body 1.

However, the reinforced plastic frame panel having the structure shown in FIG. 1 is problematic in that it must be produced through a complex process and cannot be made light. Furthermore, the reinforced plastic used as the material of the frame panel is very expensive, which increases the cost of the frame panels. For example, the GMT (glass mat thermoplastic) is problematic in that it requires a complex pressing process and is very difficult to recycle. Furthermore, the GMT is 4~5 times as expensive as steel.

In an effort to overcome the problem of the first conventional technique, Korean Patent Laid-open Publication No. 10-2004-0030082 (International Laid-open Publication No. WO. 2003/016091) discloses a seat system having a reinforcing pattern comprising a hollow pattern and a groove pattern (second conventional technique). The seat system according to the second conventional technique is shown in FIGS. 2 and 3.

FIG. 2 is a perspective view illustrating the seat back frame panel according to the second conventional technique. FIG. 3 is a sectional view taken along the line I-I in FIG. 2.

As shown in FIGS. 1 and 2, to produce a seat back frame panel, a front plate 2 and a rear plate 3 are separately produced through forming and, thereafter, the front plate 2 and the rear plate 3 are integrated with each other at joins 4 using an adhesive, thus forming a panel body. Furthermore, a hollow pattern 5, a groove pattern 6 and a protruding pattern 7 are formed as a reinforcing pattern on the panel body, so that a desired seat back frame panel is produced. In the seat back frame panel, the hollow pattern 5 and the groove pattern 6 provide advantages in that, due to the patterns 5 and 6, the frame panel can efficiently absorb shocks, increase the structural strength, and realize lightness.

However, the second conventional technique disclosed in the cited document is problematic in that, because the front plate 2 and the rear plate 3 are separately produced through forming and, thereafter, the front and rear plates 2 and 3 are laminated with each other at the joins 4 using the adhesive to form the single panel body, the second conventional technique complicates the process of producing the seat back frame panels. Described in detail, the process of forming the front plate 2 and the rear plate 3, and the process of laminating the front and rear plates 2 and 3 with each other into a single panel body must be executed separately and independently, so that the process of producing the frame panel is complicated. Furthermore, when the front plate 2 and the rear plate 3 are laminated with each other into a single panel body at the joins 4, it is not easy to precisely arrange the plates 2 and 3 relative to each other, so that smooth or precise joins 4 are not provided. The above-mentioned problems experienced in the process of producing the frame panels increase the cost of the products. Particularly, because the frame panel disclosed in the cited document has the joins 4, the structural strength of the frame panel is reduced at the joins and, furthermore, the frame panel may break at the joins 4 when the frame panel is severely bent.

DISCLOSURE

Technical Problem

Accordingly, the present invention has been made keeping in mind the above problems occurring in the prior art, and an object of the present invention is to provide a frame panel, which comprises a front plate and a rear plate integrally formed as a single body through a blowing process, and which is provided with an improved reinforcing pattern configured as an improved hollow pattern and improved groove patterns, so that the frame panel realizes lightness, provides excellent structural strength, is easily produced, and remarkably reduces the manufacturing cost thereof.

Technical Solution

In order to achieve the above object, according to the present invention, there is provided a frame panel comprising a panel body including a front plate and a rear plate, with both a hollow pattern and a groove pattern formed as a reinforcing pattern on the panel body, wherein the front plate and the rear plate are integrally formed as a single body through a blowing process;

the front plate is provided with vertical groove patterns and a horizontal groove pattern on an outside area except for a central area thereof;

the rear plate is provided with vertical groove patterns and horizontal groove patterns on each of a central area and an outside area thereof, thus having rectangular reinforcing groove patterns, with a diagonal groove pattern diagonally extending upwards from a lower end of a side of the rectangular reinforcing groove pattern provided on the outside area of the rear plate such that the diagonal groove pattern passes through the rectangular reinforcing groove pattern provided on the central area of the rear plate.

The frame panel according to the present invention is preferably formed through a blowing process, particularly, a blowing process using injected air. During the blowing process of producing the frame panel, the hollow pattern and the groove patterns are simultaneously formed on the frame panel. The hollow pattern is formed by the flow of air injected into a parison through an air injection nozzle, so that the hollow pattern continuously extends without interruption. In the frame panel, each of the front plate and the rear plate preferably has constant thickness.

Furthermore, the frame panel according to the present invention may be provided with a latch bracket, which locks the frame panel to a car body, thus allowing the frame panel to be efficiently used as a support of a car seat back. The frame panel also has a hinge bracket, which locks the frame panel to the bottom frame of a car seat.

Advantageous Effects

As is apparent from the above descriptions, the frame panel according to the present invention provides advantages in that the front plate and the rear plate are formed as a single body through blowing, thus simplifying the process of producing the frame panel, the frame panel is configured as a structure without joins, thus having excellent strength, and the hollow pattern and the groove pattern are formed as the reinforcing pattern on the frame panel at appropriate positions such that the patterns have appropriate orientations and appropriate depths, thereby realizing lightness and excellent strength of the frame panel.

BEST MODE

Hereafter, the present invention will be described with reference to the accompanying drawings. The accompanying drawings illustrate a preferred embodiment of the present invention.

Figure 1:
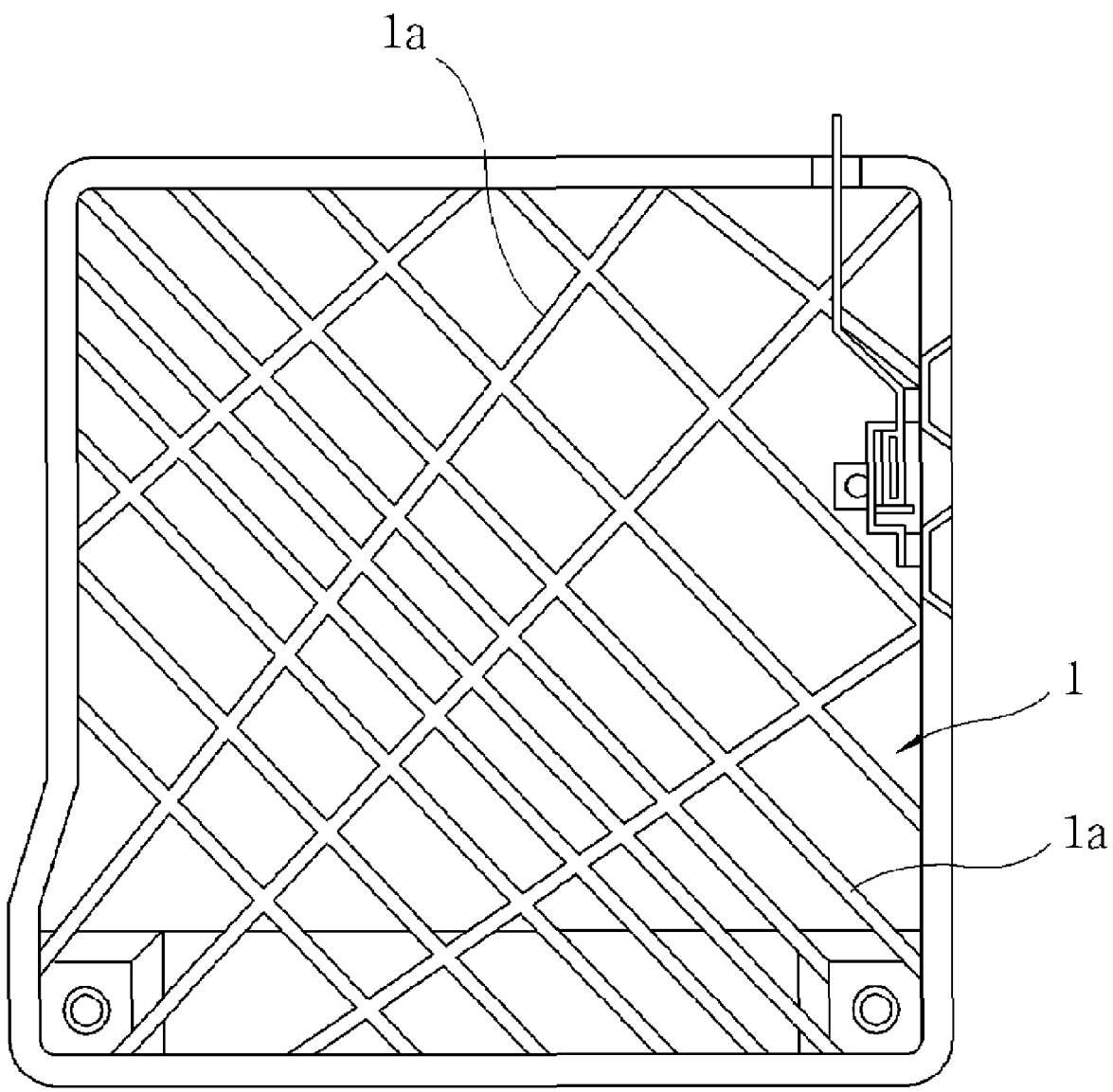
FIG. 1 is a plan view illustrating a seat back frame panel according to a first conventional technique.
Figure 2:
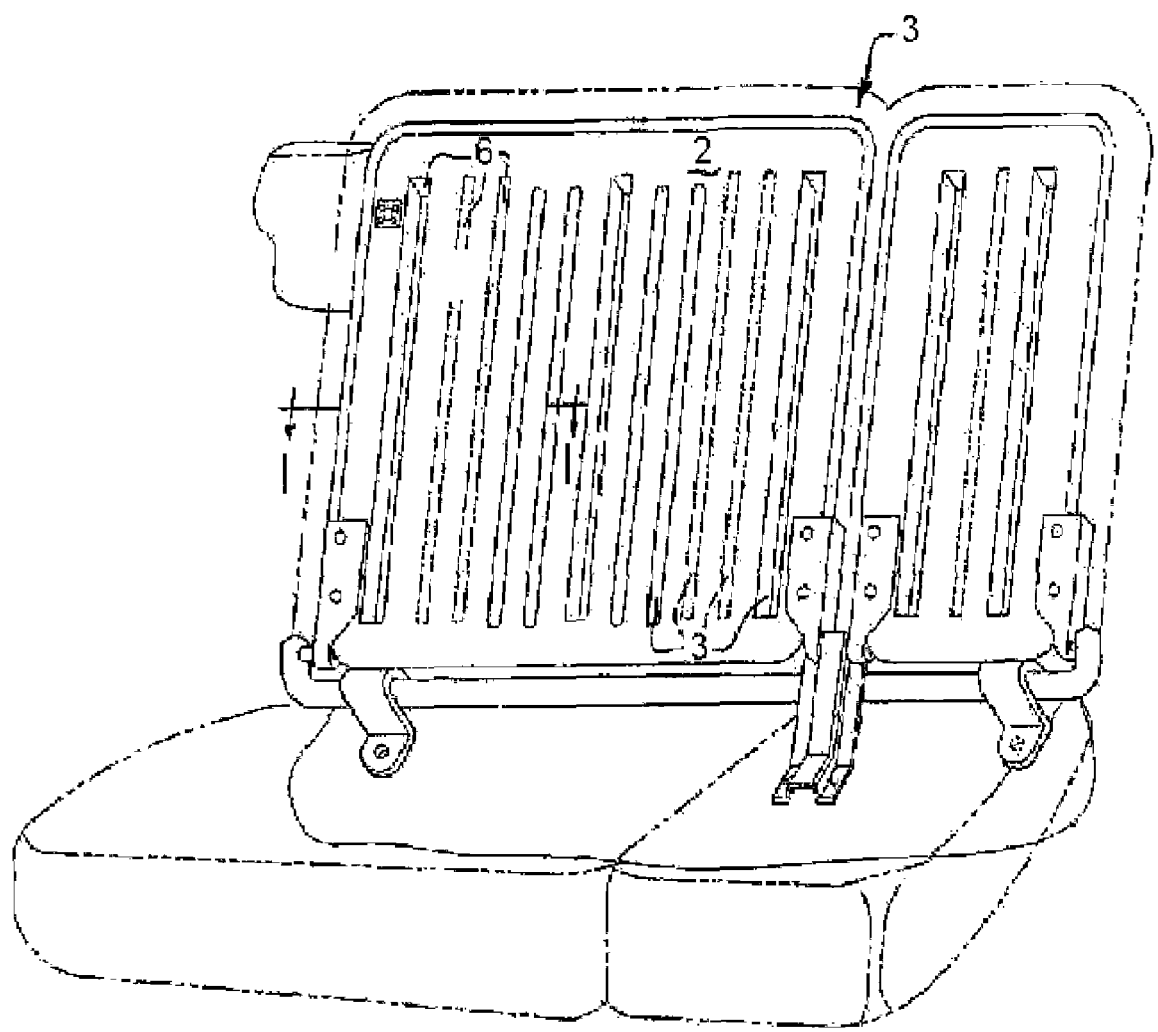
FIG. 2 is a perspective view illustrating a seat back frame panel according to a second conventional technique.
Figure 3:
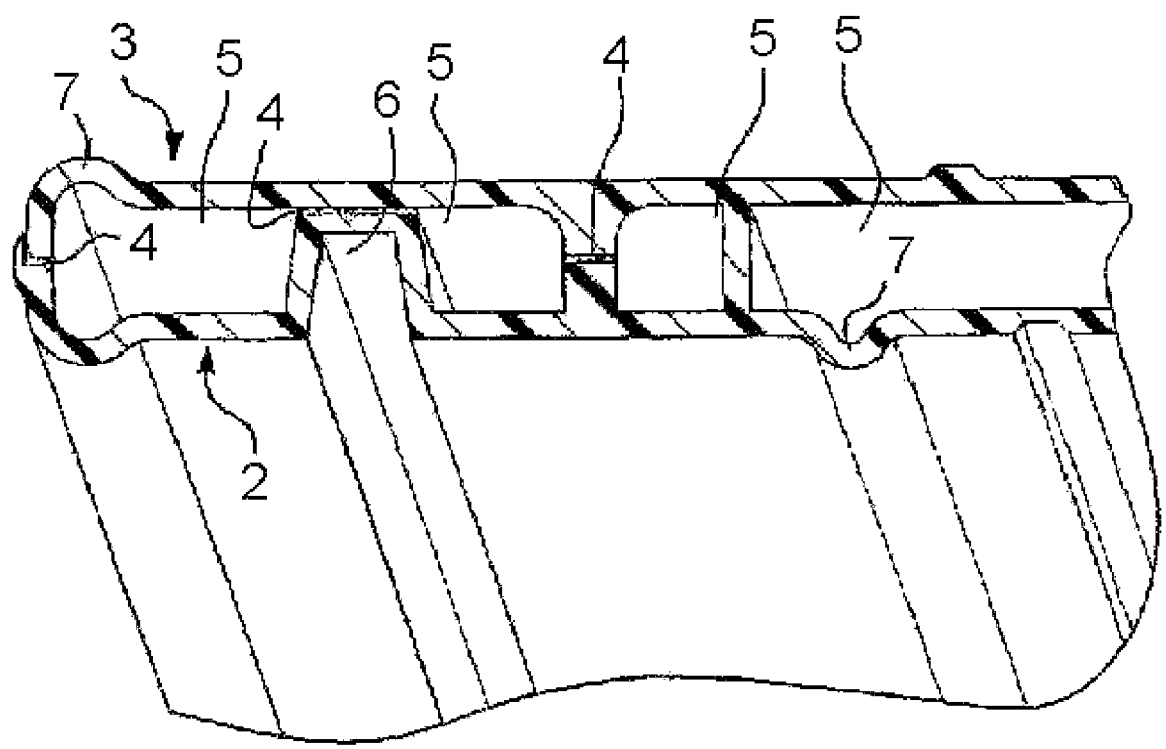
FIG. 3 is a sectional view taken along the line I-I in FIG. 2.
Figure 4:
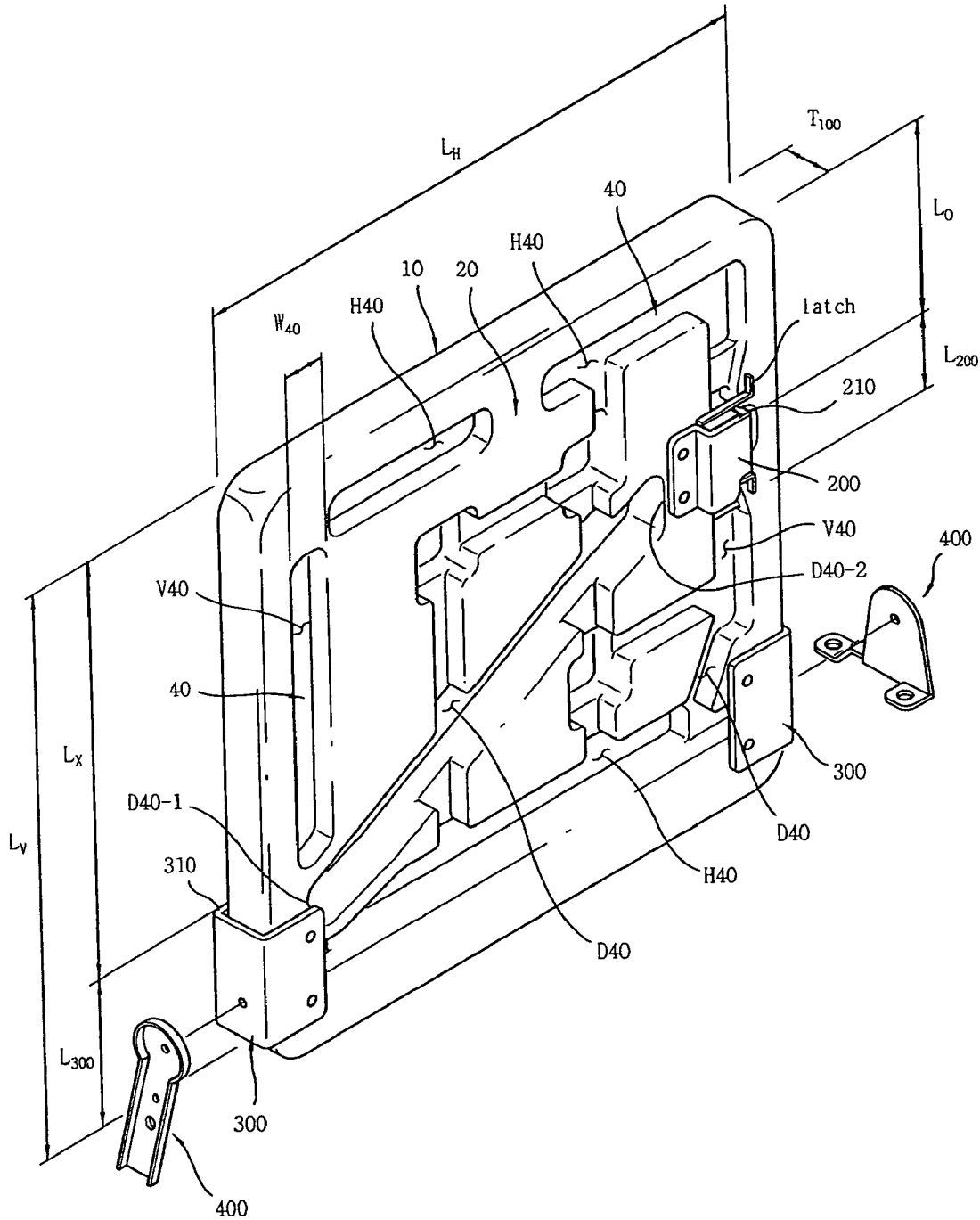
FIG. 4 is a perspective view illustrating a seat back frame panel according to a preferred embodiment of the present invention when the frame panel is viewed from a rear plate.
Figure 5:
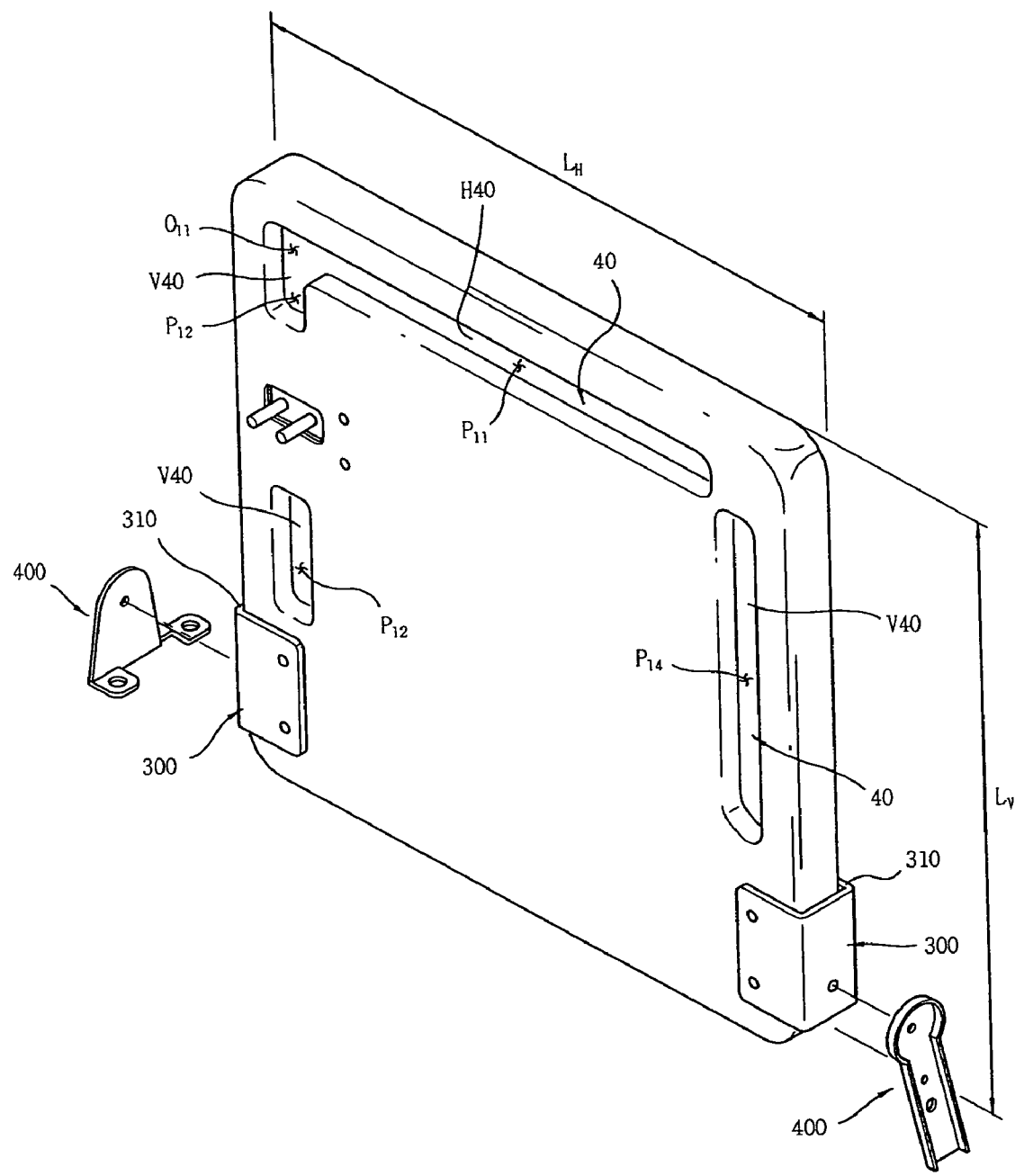
FIG. 5 is a perspective view illustrating the seat back frame panel according to the preferred embodiment of the present invention when the frame panel is viewed from a front plate.
Figure 6:
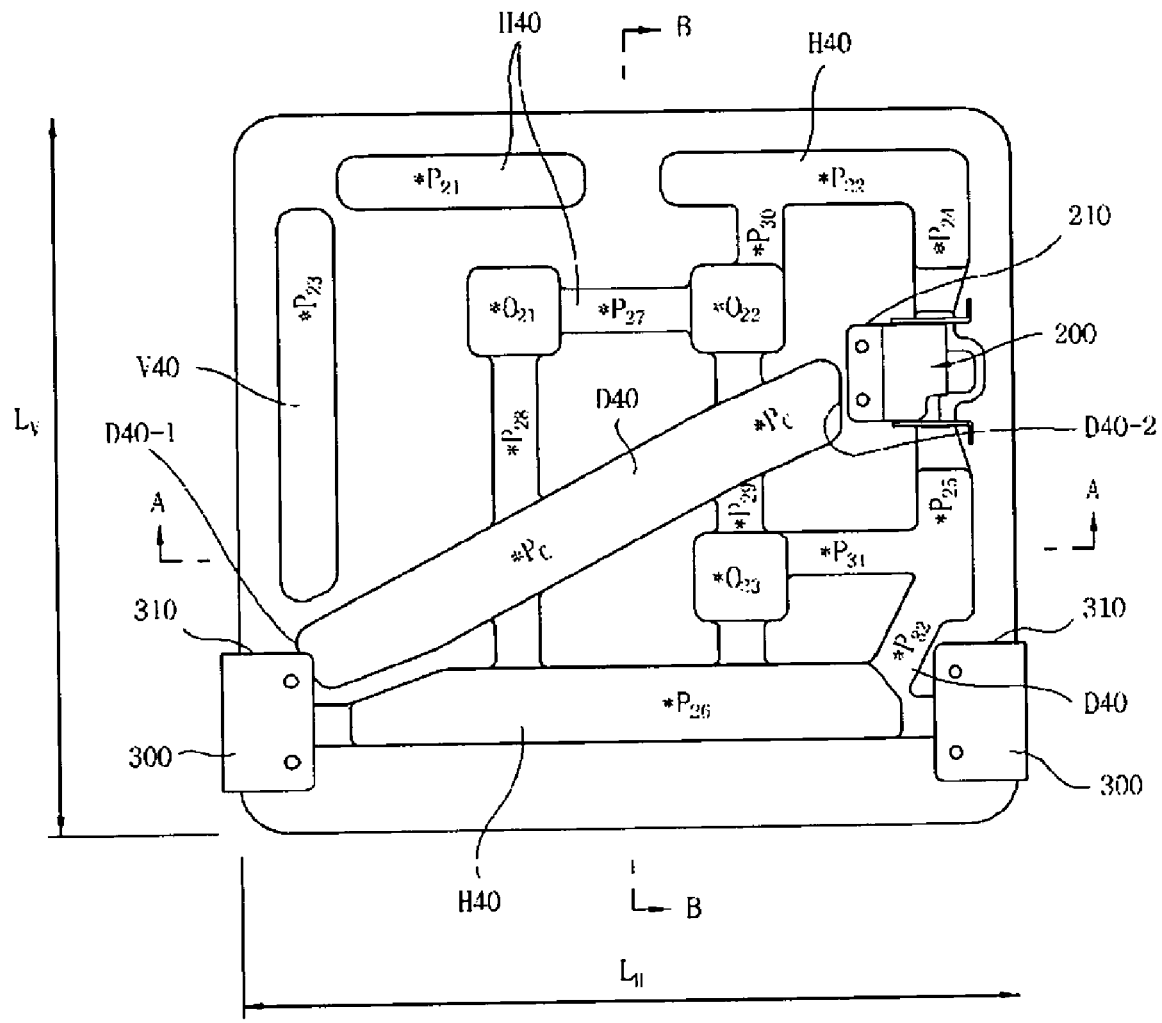
FIG. 6 is a front view of FIG. 4.
Figure 7:
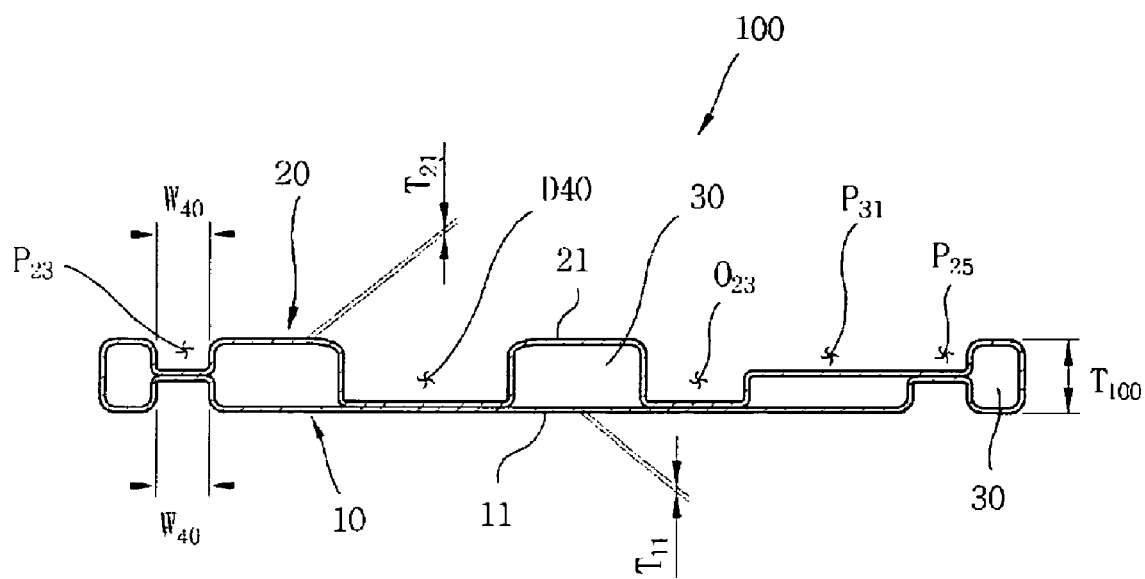
FIG. 7 is a sectional view taken along the line A-A in FIG. 6.
Figure 8:
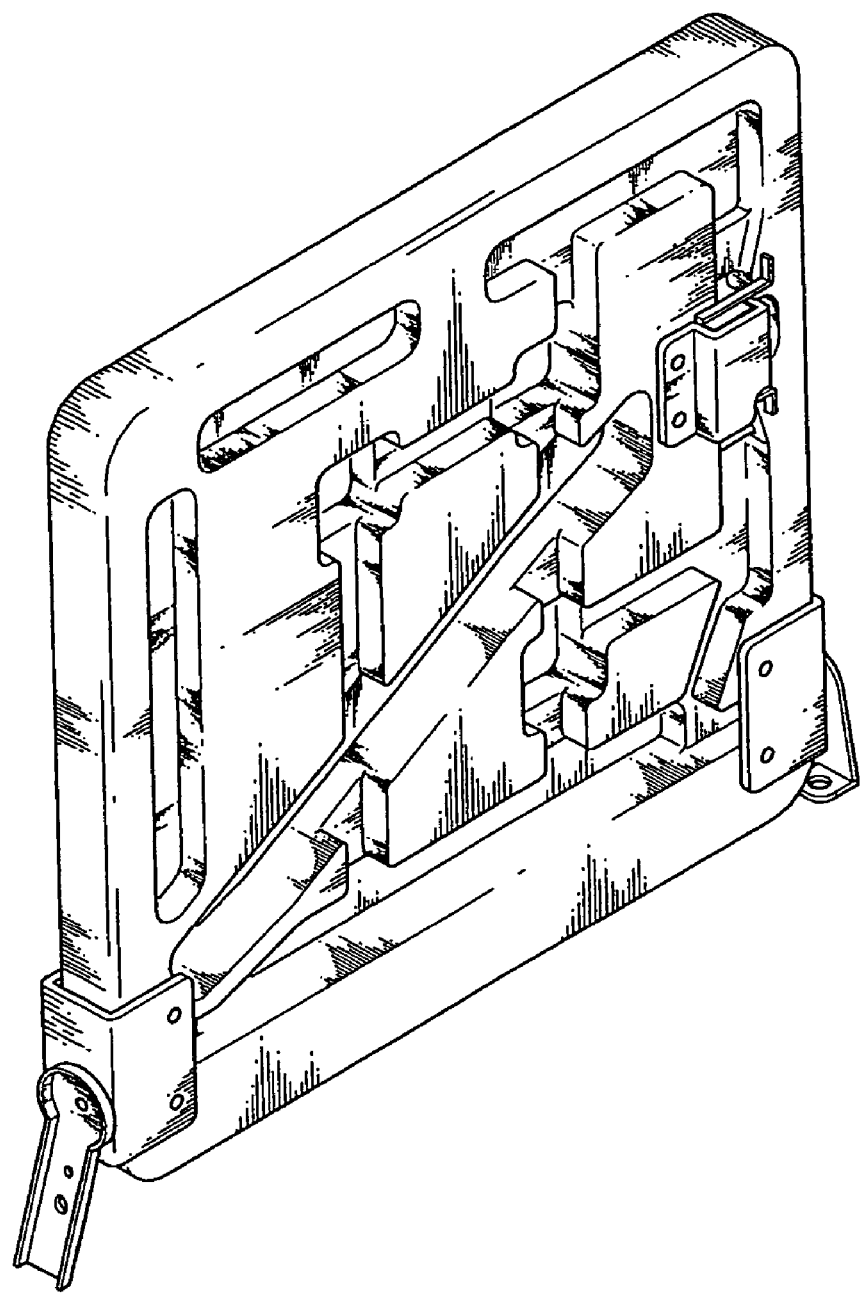
FIG. 8 illustrates an image of the frame panel of FIG. 4.
Figure 9:
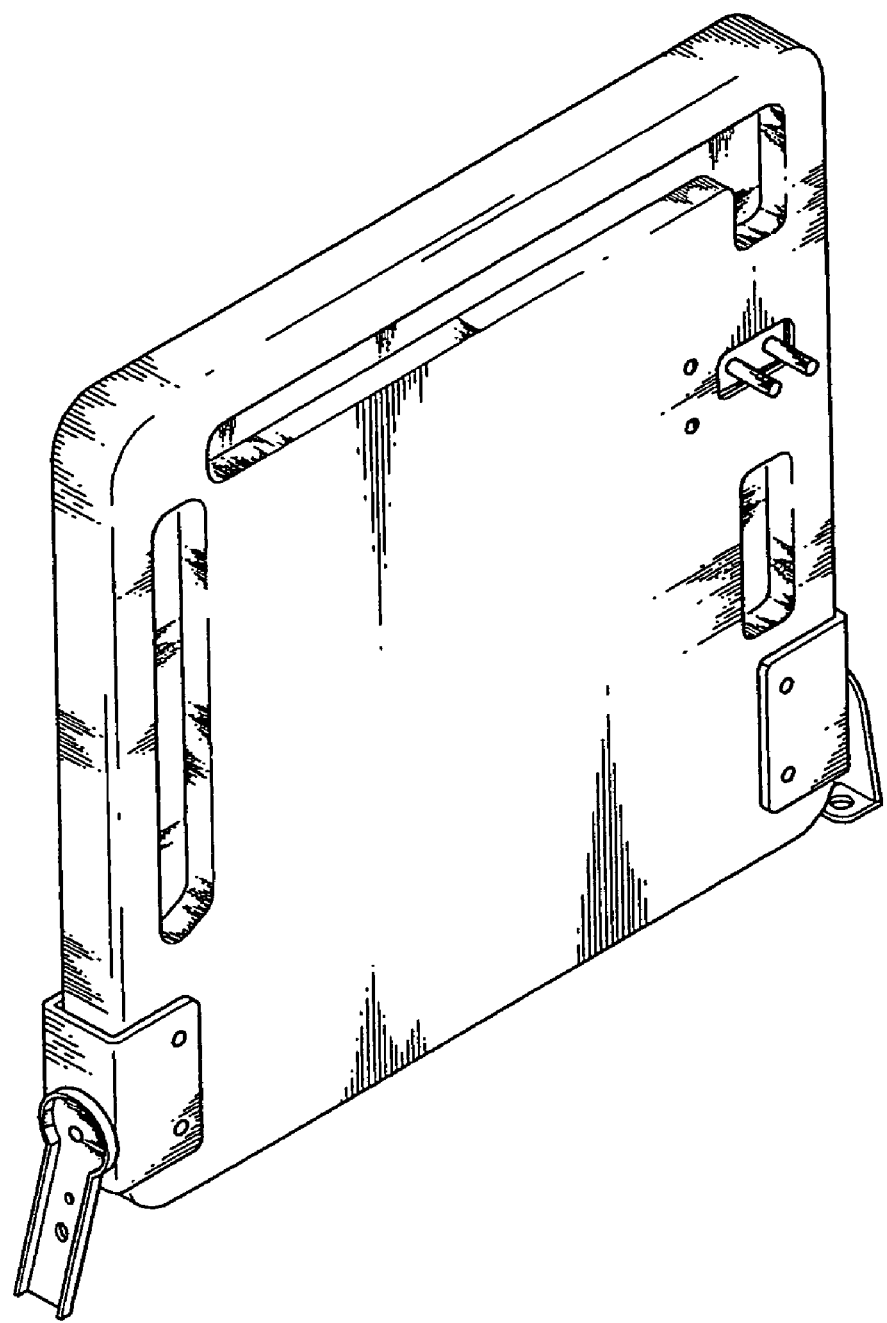
FIG. 9 illustrates an image of the frame panel of FIG. 5.
Figure 10:
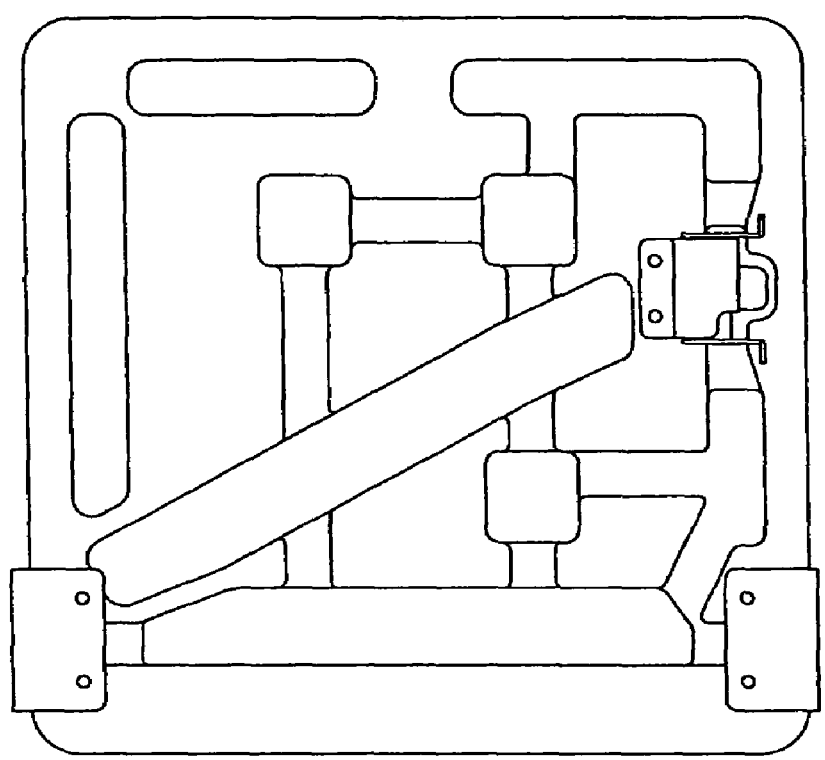
FIG. 10 illustrates an image of the frame panel of FIG. 6.

FIGS. 4 and 5 are perspective views of a frame panel according to the present invention, in which FIG. 4 is a perspective view of the frame panel viewed from a rear plate and FIG. 5 is a perspective view of the frame panel viewed from a front plate. FIG. 6 is a front view of FIG. 4. FIG. 7 is a sectional view taken along the line A-A in FIG. 6. FIGS. 8, 9 and 10 illustrate images of the frame panel of FIGS. 4, 5 and 6, respectively, to clearly show the structure of the reinforcing pattern according to the present invention.

The frame panel according to the present invention comprises a panel body 100 comprising a front plate 10 and a rear plate 20, in which the front plate 10 and the rear plate 20 are integrally formed as a single structure without joins through a blowing process. The panel body 100 has a reinforcing pattern for securing a desired strength and for realizing lightness. The reinforcing pattern is provided by the combination of a hollow pattern 30, which is formed between the front plate 10 and the rear plate 20, and groove patterns 40, which are formed on both the front plate 10 and the rear plate 20 during the process of integrally forming the front and rear plates 10 and 20. The hollow pattern 30 realizes lightness and excellent shock absorption effect of the panel body 100 and allows the panel body 100 to efficiently resist bending, while the groove patterns 40 efficiently increase the impact strength of the panel body 100.

The hollow pattern 30 is formed by the flow of injected air during the blowing process such that the hollow pattern 30 continuously extends without interruption. Each of the groove patterns 40 is formed on the front plate 10 or the rear plate 20 by depressing the plate to a predetermined depth. The groove patterns 40 comprise combinations of a variety of depthwise patterns, which include vertical groove patterns, horizontal groove patterns, and diagonal groove patterns. Each of the depthwise patterns is depressed to a depth equal to the entire thickness $T_{100}$ of the panel body 100 or to ½ of the thickness $T_{100}$. The groove patterns 40 having the various shapes mentioned above meet and cross each other at one point. Furthermore, when the groove pattern 40 formed at a predetermined position has a depth equal to ½ of the thickness $T_{100}$ of the panel body 100, the hollow pattern 30 corresponding to said groove pattern 40 has a cross-sectional thickness almost equal to ½ of the thickness of the panel body 100. In the above case, the hollow pattern 30 may be called a "½ depth hollow pattern".

The technical terms used in the following description will be accompanied by terms expressing the orientation and depth of the patterns for easy comprehension of the present invention. For example, the technical term 'vertical groove pattern' used in the present invention means a directional pattern, which is longitudinally formed on the panel body 100 in a vertical direction. The technical term '½ depth pattern' means a depthwise pattern, which is formed on the front plate 10 or on the rear plate 20 of the panel body 100 to a depth equal to ½ of the thickness $T_{100}$ of the panel body 100. The technical term 'full depth junction pattern' means a depthwise pattern, which is formed on the front plate 10 or on the rear plate 20 to a depth almost equal to the entire thickness of the panel body 100, so that the two plates 10 and 20 are integrated with each other at the full depth junction patterns and flat parts corresponding to the full depth junction patterns. The technical term '½ depth junction pattern' means a depthwise pattern, which is formed on each of the front plate 10 and the rear plate 20 to a depth equal to ½ of the thickness $T_{100}$ of the panel body 100, so that the ½ depth junction patterns of the front and rear plates 10 and 20 are integrated with each other at an intermediate position between the two plates 10 and 20.

Furthermore, in the accompanying drawings, the reference numerals related to the groove patterns 40 are accompanied by initials expressing the orientations of the groove patterns. Described in detail, the groove patterns formed on the front and rear plates 10 and 20 are designated by different reference numerals such that the reference numeral of the groove pattern extending in a horizontal direction is accompanied by the initial H (Horizontal), the numeral of the groove pattern extending in a vertical direction is accompanied by the initial V (Vertical), and the numeral of the groove pattern extending in a diagonal direction is accompanied by the initial D (Diagonal). Described in brief, the reference numeral of each of the directional patterns is accompanied by the initial, H, V or D. For example, the reference numeral V40 denotes a vertical groove pattern, which extends vertically, and D40 denotes a diagonal groove pattern, which extends diagonally.

According to the present invention, the location, orientation and depth of each of the groove patterns 40 function as very important factors determining the structural strength and formability of the panel body 100.

The front plate 10 and the rear plate 20 have respective groove patterns 40. The front plate 10 is provided with a plurality of groove patterns 40 on the outside area except for the central area. Preferably, the groove patterns 40 of the front plate 10 are formed within the upper, left and right sides of the outside area thereof. Described in detail, on the front plate 10, a plurality of vertical groove patterns V40 and a plurality of horizontal groove patterns H40 are formed on the upper part, left-side part and right-side part of the outside area except for both the central area and the lower part of the outside area, so that a reversed U-shaped reinforcing groove pattern 40 is defined. In the present invention, as shown in FIG. 5, the reversed U-shaped reinforcing groove pattern 40 is formed by the combination of one upper horizontal groove pattern H40, which is horizontally formed on the upper part of the outside area of the front plate 10 at a position $P_{11}$; two left vertical groove patterns V40, which are vertically formed on the left-side part of the outside area at respective positions $P_{12}$ and $P_{13}$; and one right vertical groove pattern V40, which is formed on the right-side part of the outside area at a position $P_{14}$. In the above state, the upper horizontal groove pattern H40 placed at the position $P_{11}$ preferably meets the left vertical groove pattern V40, which is placed at the position $P_{12}$, at a point $O_{11}$ adjacent to an upper corner of the panel body 100. Furthermore, each of the vertical groove patterns V40 and the horizontal groove pattern H40, which are formed on the front plate 10, is preferably configured as a ½ depth pattern.

On the rear plate 20, a plurality of groove patterns 40 is formed on the central area in addition to the outside area of the rear plate 20. Described in detail, the rear plate 20 is provided with a plurality of vertical groove patterns V40 and a plurality of horizontal groove patterns H40 on both the central area and the outside area thereof, thus forming rectangular reinforcing groove patterns 40 by the combination of the vertical groove patterns V40 and the horizontal groove patterns H40.

Described in detail, as shown in FIGS. 4 and 6, the rectangular reinforcing groove pattern 40 provided on the outside area of the rear plate 20 is defined by the combination of two upper horizontal groove patterns H40, which are horizontally formed on the upper part of the outside area of the rear plate 20 at respective positions $P_{21}$ and $P_{22}$; one left vertical groove pattern V40, which is vertically formed on the left-side part of the outside area at a position $P_{23}$; two right vertical groove patterns V40, which are vertically formed on the right-side part of the outside area at respective positions $P_{24}$ and $P_{25}$; and one lower horizontal groove pattern H40, which is horizontally formed on the lower part of the outside area at a position $P_{26}$.

The rectangular reinforcing groove pattern 40 provided on the central area of, the rear plate 20 is defined by one upper horizontal groove pattern H40, which is horizontally formed on the upper part of the central area at a position $P_{27}$; one left vertical groove pattern V40, which is vertically formed on the left-side part of the central area at a position $P_{28}$; one right vertical groove pattern V40, which is formed on the right-side part of the central area at a position $P_{29}$; and the lower horizontal groove pattern H40, which is formed on the lower part of the outside area at the position $P_{26}$.

In the rear plate 20, the horizontal groove pattern H40 formed at the position $P_{22}$ in the outside area and the horizontal groove pattern H40 formed at the position $P_{27}$ in the central area are preferably connected to each other through a vertical groove pattern V40, which is formed at a position $P_{30}$. Furthermore, the vertical groove pattern V40 formed at the position $P_{29}$ of the central area and the vertical groove pattern V40 formed at the position $P_{25}$ of the outside area are preferably connected to each other through a horizontal groove pattern H40, which is formed at a position $P_{31}$.

In the present invention, the vertical groove patterns V40 and the horizontal groove patterns H40, which are formed on the upper part, left-side part and right-side part of the outside area of the rear plate 20, are preferably configured as ½ depth junction patterns. Described in detail, the horizontal groove patterns H40 formed at the positions $P_{21}$ and $P_{22}$ of the outside area and the vertical groove patterns V40 formed at the positions $P_{23}$, $P_{24}$ and $P_{25}$ of the outside area are preferably configured as ½ depth junction patterns, which are integrated with the groove patterns 40 of the front plate 10 at positions corresponding to ½ of the thickness $T_{100}$ of the panel body 100. Furthermore, the horizontal groove pattern H40 formed at the position $P_{26}$ in the outside area of the rear plate 20 is preferably configured as a full depth junction pattern, which is depressed toward the front plate 10 to a depth equal to the entire thickness $T_{100}$ of the panel body 100 and is integrated with the front plate 10.

Furthermore, the vertical groove patterns V40 and the horizontal groove pattern H40, which are formed on the central area of the rear plate 20 except for the outside area, are preferably configured as ½ depth patterns. Described in detail, the horizontal groove pattern V40 and the vertical groove patterns V40, which are formed at the respective positions $P_{27}$, $P_{28}$ and $P_{29}$ in the central area, and the vertical groove pattern V40 and the horizontal groove pattern V40, which are formed at the respective positions $P_{30}$ and $P_{31}$, are preferably configured as ½ depth patterns. The hollow pattern 30 provided around the ½ depth patterns is preferably configured as a ½ depth hollow pattern.

Furthermore, the points $O_{21}$, $O_{22}$ and $O_{23}$ in the central area of the rear plate 20 are preferably configured as full depth junction patterns, which are depressed toward the front plate 10 to a depth equal to the entire thickness $T_{100}$ of the panel body 100 and are integrated with the front plate 10.

The rear plate 20 further includes a diagonal groove pattern D40, which extends diagonally upwards from the lower end of the left-side part of the rectangular reinforcing groove pattern 40 formed in the outside area of the rear plate 20 and passes through the rectangular reinforcing groove pattern 40 formed in the central area. Described in detail, as shown in FIGS. 4 and 6, the diagonal groove pattern D40 intersects both the vertical groove pattern V40 formed at the position $P_{28}$ in the central area of the rear plate 20 and the vertical groove pattern V40 formed at the position $P_{29}$ in the central area, thus forming intersecting points PC. In the present invention, as shown in FIG. 7, the diagonal groove pattern D40 of the rear plate 20 is preferably configured as a full depth junction pattern, which is depressed toward the front plate 10 to a depth equal to the entire thickness $T_{100}$ of the panel body 100 and is integrated with the front plate 10.

Furthermore, the rear plate 20 further includes another diagonal groove pattern D40, which is formed at a position $P_{32}$ in the outside area of the rear plate 20 such that the diagonal groove pattern D40 connects the vertical groove pattern V40 formed at the position $P_{25}$ in the outside area to the horizontal groove pattern H40 formed at the position $P_{26}$. The diagonal groove pattern D40 provided at the position $P_{32}$ is preferably configured as a ½ depth pattern.

The materials of the panel body 100 may be selected from a variety of materials, which can be processed through a blowing process. Preferably, the panel body 100 is made of a thermoplastic material, for example, polypropylene, polyethylene, polycarbonate, polystyrene, polyamide, polyester, polyethylene terephthalate and mixtures thereof. Most preferably, the panel body 100 is made of composite plastic, which is prepared by mixing a filler with a thermoplastic material.

In the present invention, the thermoplastic material is preferably selected from polypropylene (PP) or polyethylene (PE) because they have advantages of high formability and low price. The filler is selected from materials that can increase the strength of the thermoplastic material without reducing workability while blowing a parison to produce a frame panel. For example, the filler may comprise one, two or more selected from single fibers or micro-powdered natural minerals. Preferably, the filler comprises at least one selected from glass fibers as single fibers and micro-powdered talc. Furthermore, the filler is preferably added in an amount of 11~15 parts by weight based on 100 parts by weight of the composite plastic. When the amount of filler exceeds 15 parts by weight, the filler may reduce the formability of the composite plastic. When the amount of filler is less than 11 parts by weight, the filler may fail to increase the strength of the composite plastic to a desired level. Furthermore, the composite plastic may be added with a pigment, a release agent, etc.

Furthermore, each of the walls 11 and 21 of the front plate 10 and the rear plate 20 preferably has a constant thickness $T_{11}$, $T_{21}$ over the entire area thereof. Although the thicknesses $T_{11}$ and $T_{21}$ of the walls 11 and 21 of the front and rear plates 10 and 20 are not limited in the present invention, the thicknesses $T_{11}$ and $T_{21}$ preferably have a range of 1.0 mm~10.0 mm. In addition, the thickness $T_{100}$ of the panel body 100 and the width $W_{40}$ of the groove pattern 40 may have a range of 10.0 mm~100.0 mm. To prevent the failure of forming the hollow pattern 30 in the panel body 100 or to prevent the formation of uneven thickness $T_{11}$, $T_{21}$ of the front and rear plates 10 and 20 due to an uneven flow of injected air, and to realize desired strength of the frame panel, the panel body 100 preferably has thickness $T_{100}$ of 40.0 mm~50.0 mm and the groove pattern 40 preferably has width $W_{40}$ of 20.0 mm~60.0 mm.

In the present invention, the panel body 100 is preferably produced through a blowing process using injected air. Described in detail, to produce a panel body, a hollow parison is inserted in a blowing mold, with an air injection nozzle installed in an end of the parison. After the parison has been inserted in the blowing mold, air in blown into the parison through the air injection nozzle while the parison is maintained in a slightly melted state, so that a desired panel body is formed. The blowing process of forming the panel body according to the present invention will be described in detail herein below, with reference to FIGS. 11 and 12.

Figure 11:
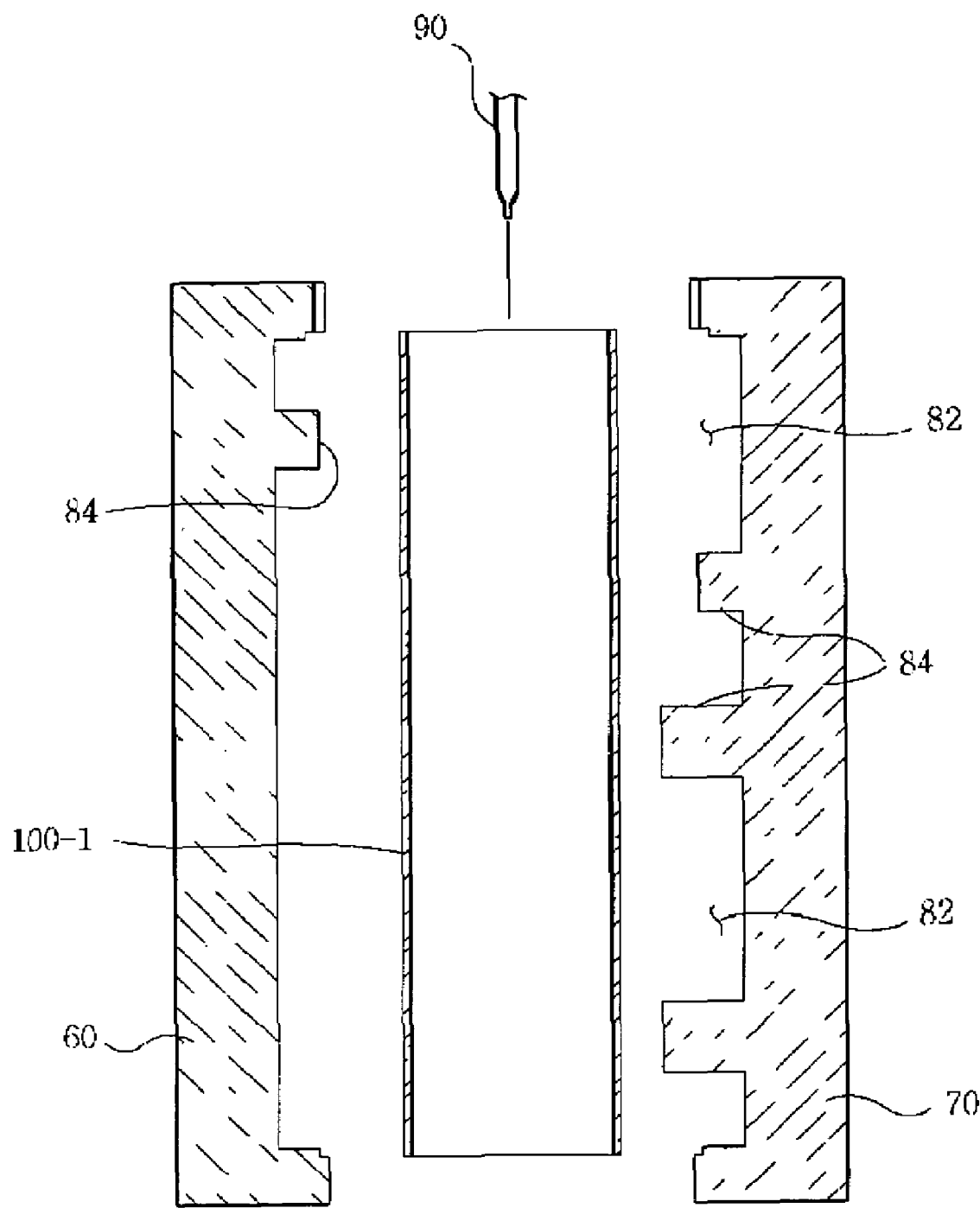
FIG. 11 is a sectional view of blowing molds, which illustrates a method of molding a panel body of the frame panel according to the present invention.
Figure 12:
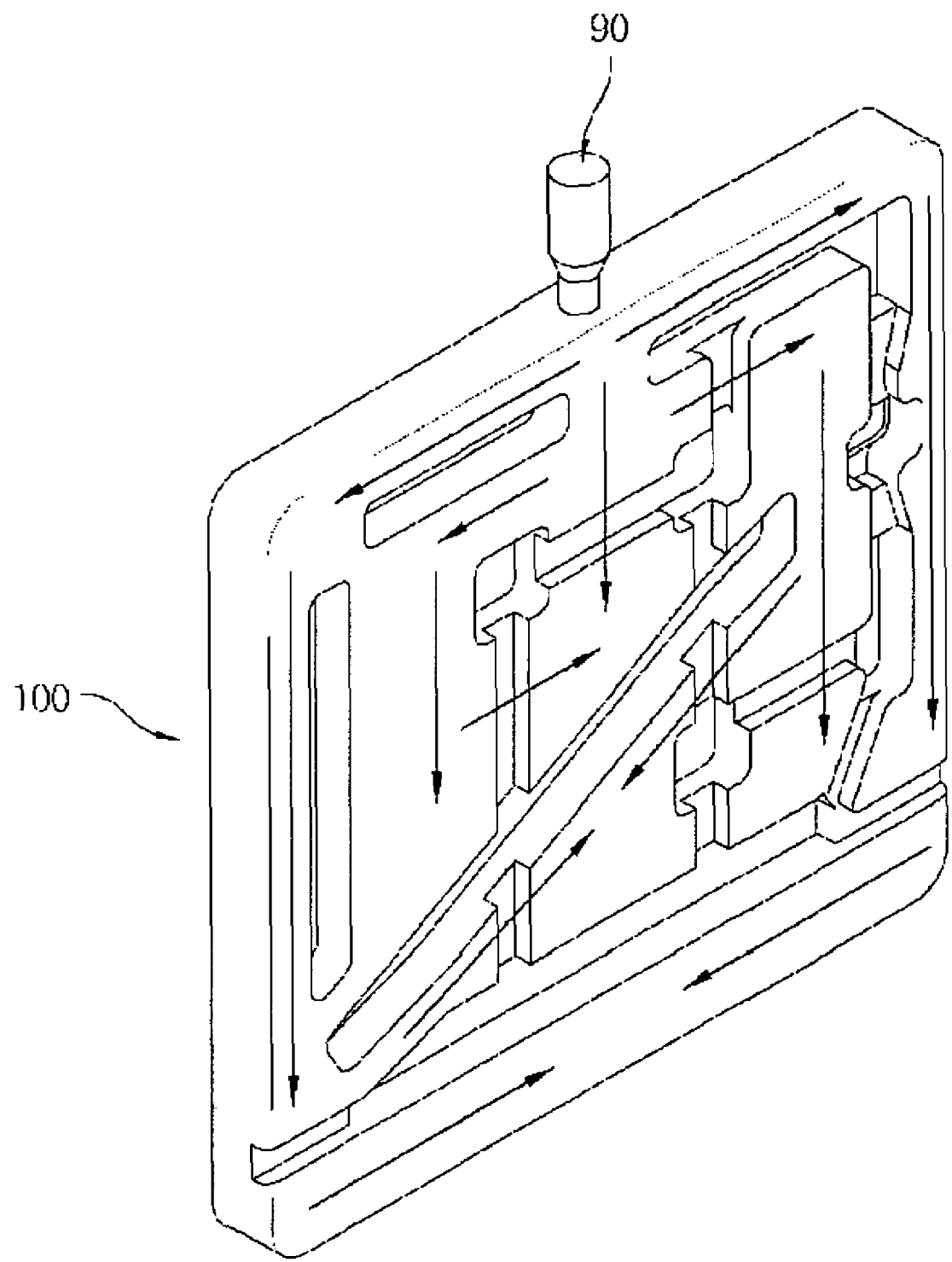
FIG. 12 is a perspective view of the panel body, which illustrates currents of air in the panel body during a process of molding the panel body.

FIGS. 11 and 12 illustrate a molding process of producing the panel body 100 through blowing according to a preferred embodiment of the present invention, in which FIG. 11 is a sectional view of the blowing mold, which can be assumed to have been taken along the line B-B of FIG. 6 and schematically shows the construction of the blowing mold having a parison therein, and FIG. 12 is a perspective view of the panel body, which illustrates currents of air in the panel body 100 during the molding process.

As shown in FIG. 11, the blowing mold comprises two molds 60 and 70, with depressions 82 and protrusions 84 provided on the inner surfaces of the two molds 60 and 70 to form the hollow pattern 30 and the groove patterns 40 on the panel body 100. The depressions 82 form the hollow pattern 30, while the protrusions 84 form the groove patterns 40.

To produce a panel body, a parison 100-1, which is a partially shaped mass of molten composite plastic, is inserted in the blowing mold. Described in detail, the parison 100-1 is a hollow tubular body, which has been produced through an extrusion process and has a circular cross-section. The parison 100-1 may be dropped from an extrusion die into the gap between the molds 60 and 70. After the parison 100-1 has been inserted into the gap of the molds 60 and 70, an air injection as nozzle 90 is installed at an end of the parison 100-1. Thereafter, the two molds 60 and 70 are hermetically assembled with each other into a blowing mold and air is blown into the parison 100-1 through the air injection nozzle 90. In the above state, the parison 100-1 is pneumatically forced by injected air to come into close contact with the inner surfaces of the molds 60 and 70. Air continuously flows in directions shown in FIG. 12, thus forming a continuously extending hollow pattern 30 and a variety of groove patterns 40. FIG. 12 shows a molded panel body 100, with the air injection nozzle 90 installed in the panel body 100.

In the molds 60 and 70, the depressions 82 and the protrusions 84 form the hollow pattern 30 and the groove patterns 40, so that the depths, heights, widths and locations of both the depressions 82 and the protrusions 84 function as very important factors, which determine both the strength of the panel body 100 and the moldability capable of securing air paths in the parison during the blowing process.

According to the present invention, the front plate 10 and the rear plate 20 are integrally formed as a single body without joins through a blowing process, thus being easily produced through a simple process and having high strength. Furthermore, the locations, orientations and depths of both the hollow pattern 30 and the groove patterns 40 constituting the reinforcing pattern realize lightness and, excellent strength of the frame panel. Described in detail, the groove patterns 40 of the front plate 10 are formed on the outside area except for the central area, so that the front plate 10 has a flat appearance on the central area and has high strength capable of efficiently resisting impact imposed on the front plate 10.

Furthermore, the rear plate 20 is provided with both the vertical groove patterns V40 and the horizontal groove patterns H40 on the outside area and the central area thereof, thus providing rectangular groove patterns 40. Furthermore, the diagonal groove pattern D40 is formed on the rear plate 20 such that the pattern D40 passes through the central area of the rear plate 20. Thus, the rear plate 20 has excellent strength. In the above state, the front plate 10 and the rear plate 20 are oriented in a car seat back such that the front plate 10 faces backwards and the rear plate 20 faces forwards to support the back of a passenger. The accompanying drawings illustrate a preferred embodiment of the present invention. According to repeated experiments using panel bodies 100 having the structure shown in the drawings, it has been noted that the panel bodies substantially satisfy the standards of the European requirements ECE 17.07.

As shown in FIGS. 4 and 5, the frame panel according to the present invention may further comprise a latch bracket 200 and a hinge bracket 300, thus being efficiently used as a support in a car seat back. The latch bracket 200 is locked to a car body, while the hinge bracket 300 is locked to the bottom frame of a car seat. The brackets 200 and 300 are preferably attached to the panel body 100 using adhesive, nuts and bolts, rivets and locking screws, more preferably, metal nuts and bolts, metal rivets and metal screws. The hinge bracket 300 preferably has a structure of a U-shaped cross-section, which can be fitted over each side edge of the panel body 100. In FIGS. 4 and 5, the reference numeral 400 denotes a hinge arm jointed to the hinge bracket 300. The hinge arm 400 and the hinge bracket 300 are coupled to each other using a hinge shaft, such as a conventional pivot shaft, so that the frame panel of the present invention is rotatable relative to the hinge arms 400.

Furthermore, in the present invention, the locations of both the latch bracket 200 and the hinge bracket 300 on the panel body 100 are optimized to provide excellent strength to the frame panel. Described in detail, as shown in FIG. 6, the latch bracket 200 is preferably mounted on an upper part of a side (left or right side) of the panel body 100 such that the upper end 210 of the latch bracket 200 is placed at a predetermined position spaced downwards apart from the upper end of the panel body 100 by a distance of 15%~40% ($L_o$ in FIG. 4) of a vertical length $L_v$ of the panel body 100. The hinge bracket 300 is preferably mounted to the lower part of each of the left and right sides of the panel body 100 such that the upper end 310 of the hinge bracket 300 is placed at a predetermined position spaced downwards apart from the upper end of the panel body 100 by a distance of 60%~85% ($L_x$ in FIG. 4) of the vertical length $L_v$ of the panel body 100. Furthermore, the vertical lengths $L_{200}$ and $L_{300}$ of the latch bracket 200 and the hinge brackets 300 are preferably set to 12%~25% of the vertical length $L_v$ of the panel body 100.

When both the latch bracket 200 and the hinge brackets 300 are mounted to the panel body 100 of the present invention as described above, the diagonal groove pattern D40 of the rear plate 20 is preferably located on the rear plate 20 such that, when the panel body 100 is viewed from the rear plate 20, a first end D40-1 of the pattern D40 is placed around the left-side hinge bracket 200 and a second end D40-2 is placed around the latch bracket 300.

INDUSTRIAL APPLICABILITY

The frame panel according to the present invention is efficiently used as a support in a variety of products. For example, the frame panel is preferably used as a support in the seat back of a car, particularly, as a support in the rear seat back installed in the rear end of the passenger compartment of a passenger car.

As described above, in the frame panel according to the present invention, the front plate and the rear plate are integrally formed as a single body through a blowing process, so that the frame panel can be easily manufactured through a single process at low cost, thus being widely adopted as an inexpensive and effective frame panel. Furthermore, the frame panel is free from joins, thus having excellent strength. In addition, due to the location, orientation and depth of both the hollow pattern and the groove patterns, the present invention realizes lightness of the frame panel, provides excellent structural strength of the frame panel, and remarkably reduces the manufacturing cost of the frame panel.

Although preferred embodiments of the present invention have been described for illustrative purposes, those skilled in the art will appreciate that various modifications, additions and substitutions are possible, without departing from the scope and spirit of the invention as disclosed in the accompanying claims.

The invention is claimed is:

1. A frame panel comprising a panel body including a front plate and a rear plate, with a hollow pattern and a groove pattern formed as a reinforcing pattern on the panel body, wherein
    the front plate and the rear plate are integrally formed as a single body;
    the front plate is provided with vertical groove patterns and a horizontal groove pattern on an outside area thereof;
    the rear plate is provided with vertical groove patterns and horizontal groove patterns on each of a central area and an outside area thereof, thus having rectangular reinforcing groove patterns, with a diagonal groove pattern diagonally extending upwards from a lower end of a side of the rectangular reinforcing groove pattern provided on the outside area of the rear plate such that the diagonal groove pattern passes through the rectangular reinforcing groove pattern provided on the central area of the rear plate;
    wherein each of the vertical groove patterns and the horizontal groove patterns provided on upper, left- and right-side parts of the outside area of the rear plate is integrated with the front plate at a position equal to ½ of a thickness of the panel body;
    the horizontal groove pattern provided on a lower part of the outside area of the rear plate is depressed to a depth equal to the entire thickness of the panel body and is integrated with the front plate;
    each of the vertical groove pattern and the horizontal groove pattern provided on the central area of the rear plate is depressed to a depth equal to ½ of the thickness of the panel body; and the diagonal groove pattern provided on the rear plate is depressed to a depth equal to the entire thickness of the panel body and is integrated with the front plate.

2. The frame panel according to claim 1, wherein the thickness of the panel body is 40.0mm~50.0mm, and a width of each of the groove patterns is 20.0mm~60.0mm.

3. The frame panel according to claim 1, wherein the panel body is made of a composite plastic including at least one filler selected from the group consisting of a glass fiber and talc.

4. The frame panel according to claim 3, wherein the filler is added in an amount of 11~15 parts by weight based on 100 parts by weight of the composite plastic.

5. The frame panel according to claim 1, further comprising:
   a latch bracket mounted on an upper part of a side of the panel body such that an upper end of the latch bracket is placed at a predetermined position spaced downwards apart from an upper end of the panel body by a distance of 15%~40% of a vertical length of the panel body; and
   a hinge bracket mounted to a lower part of each of left and right sides of the panel body such that an upper end of the hinge bracket is placed at a predetermined position spaced downwards apart from the upper end of the panel body by a distance of 60%~85% of the vertical length of the panel body.

* * * * *